Feb. 8, 1966

W. A. BOOTHE 3,233,622

FLUID AMPLIFIER

Filed Sept. 30, 1963

Inventor:
Willis A. Boothe,
by Paul A. Frank
His Attorney

United States Patent Office 3,233,622

Patented Feb. 8, 1966

3,233,622

FLUID AMPLIFIER

Willis A. Boothe, Scotia, N.Y., assignor to General Electric Company, a corporation of New York Filed Sept. 30, 1963, Ser. No. 312,480
3 Claims. (Cl. 137—81.5)

My invention relates to fluid control devices, and in particular, to an analog-type fluid amplifier that has operating characteristics similar to that of an electronic zener diode.

A fluid amplifier is a device having no moving parts for containing the passage of a fluid medium therethrough and for controlling such passage by means of additional flows of a fluid medium. Fluid amplifier devices have the potential for wide application in the field of fluid power and control. Thus, they may be employed as digital and analog computing elements and also as control and power devices to operate valves and the like. Fluid amplifiers feature inherent reliability since they generally employ no moving parts, and they can be produced at low cost due to their ease of fabrication from virtually any material that is nonporous and has structural rigidity. As a result, such devices are ideal for application where nuclear radiation, high temperature, vibration, and shock may be present. Fluid amplifiers may be operated as pneumatic devices employing a compressible fluid, such as gas or air, or as hydraulic devices utilizing relatively incompressible fluid, such as water or oil.

One of the two basic types of fluid amplifiers is commonly referred to as the momentum-exchange type wherein a main or power fluid jet is deflected by one or more control jets directed laterally at the power jet and generally from opposite sides thereof. The power jet generated by conventional amplifiers of such type is normally directed midway between two fluid receivers and is deflected relative to the receivers by an amount proportional to the net sideways momentum of the control jets. This device is therefore sometimes referred to as a proportional or analog-type fluid amplifier. Deflection of the power jet results in one receiver obtaining more fluid flow or obtaining a higher pressure recovery of the power jet than the other receiver.

Fluid amplifiers of the analog type are a recent innovation and thus their application has been very limited. An application especially suited to such devices is the field of analog computation wherein fluid amplifiers may be employed as individual analog computing elements.

Therefore, one of the principal objects of my invention is to provide a fluid control device that is adapted to perform the function of an analog computing element.

The field of analog computation includes, among other elements, means to generate nonlinear mathematical functions which represent phenomenon such as backlash and deadband. In electronic computors, such phenomenon is represented by diode circuitry and the recently developed zener diode is especially applicable to this end. In this field of control systems, the zener diode finds application in compensation networks.

Therefore, another important object of my invention is to provide an analog-type fluid amplifier which has operating characteristics similar to that of a zener diode.

Briefly stated, my invention provides a new fluid-operated control device in the form of an analog-type fluid amplifier which has operating characteristics such that the output (receiver) of the amplifier remains at relatively zero fluid pressure for a predetermined range of control fluid pressure at the input and thence the output pressure increases proportionally with further increase in control fluid pressure. This characteristic is equivalent to the operating characteristics of a zener diode in electronic circuits. The characteristic is obtained by a fluid amplifier construction comprising a first fluid passage in communication with a constant pressurized fluid supply for generating a power jet of fluid and fluid receiving passage (receiver) downstream from the first fluid passage and displaced laterally from the center line thereof. Alternatively, the receiver may be aligned with the first fluid passage and a bias fluid passage is employed to obtain the initial lateral displacement (deflection) of the power jet. A second fluid passage in communication with a variable pressurized fluid supply generates a control jet of fluid in intersecting relationship to the power jet to controllably deflect the power jet relative to the receiver. A pair of vent passages are located on oposite sides of the power jet adjacent the entrance to the receiver and a jet deflecting member is positioned within one of the vent passages and displaced laterally from the center line of the first fluid passage. The deflecting member limits the deflection of the power jet and thereby prevents the undesired characteristic of a negative slope in the output fluid pressure, that is, the deflection members prevents a decrease in output pressure for increases in control fluid pressure beyond a predetermined value.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings, wherein:

Figure 1:
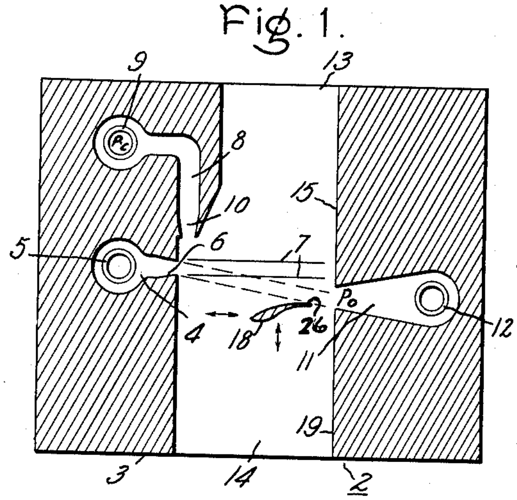
FIGURE 1 is a diagrammatic view in top plan showing a first embodiment of an analog-type fluid amplifier constructed in accordance with my invention.

Referring now to the drawings, there is illustrated in FIGURE 1 a first embodiment of an analog-type fluid amplifier which provides a function similar to the operating characteristics of an electronic component generally referred to as a zener diode. A zener diode has nonlinear operating characteristics (of current as a function of voltage) and the zener region thereof is characterized by an abrupt change from a region of substantially zero current for increasing voltage to a region of sharply increasing current for further increase in voltage.

The fluid amplifier constructed in accordance with my invention and indicated as a whole by numeral 2 includes a flat plate 3 formed of any suitable nonporous, structurally rigid materials, such as metal, glass, plastic, or the like, which is slotted in a special configuration to provide passages for fluid. The various slots in plate 3 may be formed in any suitable manner and may extend entirely through the plate or may be of lesser depth as desired. It is to be understood that the material of plate 3 must be nonreactive with the fluid flowing through the amplifier. The fluid flow is confined within the slots by means of suitable enclosures such as cover plates (not shown) which are positioned on opposite sides of plate 3. Such cover plates are held in a fluid-tight arrangement by any of a number of suitable means such as, for example, screws, clamping means, and adhesive materials. The slots which define the fluid passages are preferably rectangular in cross section, although other cross sections, such as circular, may be employed.

Figure 2:
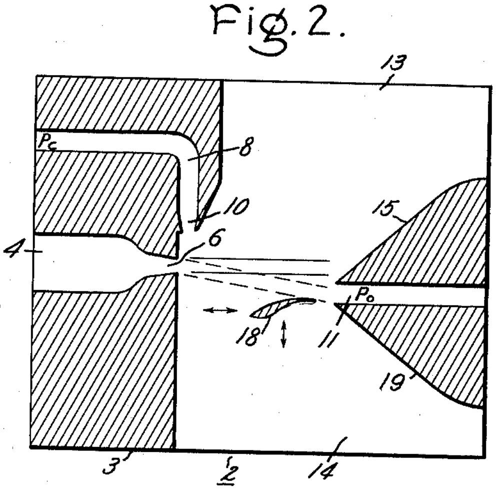
FIGURE 2 is a diagrammatic view in top plan of a second embodiment constructed in accordance with my invention.

Each fluid amplifier hereinafter described comprises a primary fluid inlet means which provides a power or main fluid flow which is to be controlled in a particular manner. The primary fluid inlet means includes a fluid passage 4 having a first end thereof in fluid communication with a source (not shown) of pressurized power of main fluid by means of conduit 5 which is illustrated as extending in a direction generally perpendicular to the plane of plate 3. Conduit 5 may comprise flexible tubing or rigid piping of suitable material which is threaded into a hole in one of the cover plates to provide a fluid-tight connection. Alternatively, passage 4 extends outwardly within plate 3 to an edge of such plate, as indicated in FIGURE 2, and conduit 5 is connected at that point. The second end of passage 4 terminates in a restricted slot forming a nozzle 6 adapted to generate a primary fluid flow in the form of a power or main jet of fluid issuing therefrom. The power jet is normally directed along a path extending along the center line of nozzle 6 as indicated by the two unbroken lines 7. In order to control deflection of the fluid jet issuing from nozzle 6, means are provided to impart lateral momentum to the jet. For this purpose, a control slot is formed in plate 3 to provide a secondary or control fluid inlet means. The secondary fluid inlet means, as illustrated in FIGURE 1, includes passage 8 having a first end thereof in fluid communication with a source (not shown) of pressurized control fluid by means of conduit 9. Conduit 9 may be connected to fluid passage 8 in the same manner as conduit 5 is connected to passage 4. The fundamental distinction between the two sources of pressurized fluid which are connected to conduits 5 and 9 is that the primary or power fluid supplied to conduit 5 is maintained to a relatively constant fluid pressure, whereas the pressure of the secondary or control fluid supplied to conduit 9 is adjustable over a relatively wide range of fluid pressure. In general, the pressure of the power fluid is greater than the maximum pressure of the control fluid but this is not a necessary condition for the operation of my device. The fluid utilized in my device may constitute a compressible fluid, such as air, to provide a pneumatic device, or the fluid may be relatively incompressible, such as oil or water, to provide a hydraulic device. The second end of passage 8 terminates in a restricted slot forming a nozzle 10 adapted to generate a control fluid flow in the form of a control jet of fluid issuing therefrom. Control nozzle 10 is positioned adjacent power nozzle 6 and the center lines thereof are approximately perpendicular such that the control jet intersects the power jet to impart lateral momentum thereto. Thus, the control jet travels in a direction substantially perpendicular to the normal or nondeflected direction of the power jet.

A fluid receiving passage 11 is disposed downstream from power nozzle 6 and is displaced laterally from the center line thereof. The fluid receiving passage, henceforth called the receiver, is the fluid flow outlet means of my device. Conduit 12 is connected to the further end of receiver 11 and conveys the output fluid flow to a suitable load device such as a valve or additional fluid amplifier of the analog or digital type. Vent passages 13 and 14 are positioned adjacent the entrance to receiver 11 and extend outwardly to the edge of plate 3 to provide communication either to the atmosphere or a return path to the pressurized fluid supply as desired. Vents 13 and 14 act to relieve the fluid pressure in the receiver which results from unusual loading conditions.

Figure 4:
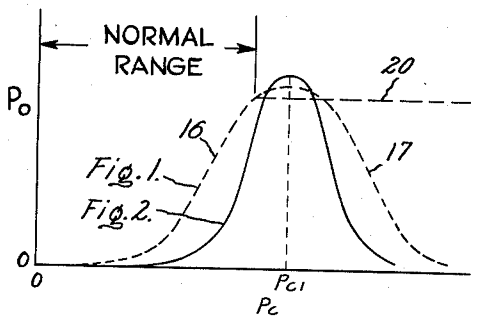
FIGURE 4 is a graph illustrating the characteristic output pressure curves of my fluid amplifier as a function of the input control fluid pressure.

In FIGURE 1 the slots in plate 3 which form vent passages 13 and 14 are formed adjacent the receiver entrance in a generally perpendicular orientation thereto. Thus, the power jet in its nondeflected state impinges upon wall 15 and is thence directed out of the device by means of vent passages 13 and 14 thereby providing substantially no fluid flow (zero pressure recovery) at receiver 11. This operating point is indicated by the intersection of the ordinate (output or recovered pressure $P_o$ at receiver 11) and the abscissa (pressure $P_c$ of the control fluid) of the characteristic curves of FIGURE 4. A gradual increase of the control fluid pressure from its zero value deflects the power jet an amount proportional to such increase in control fluid pressure, the deflection being in the direction indicated by the dashed lines in FIGURE 1 for positive increases in pressure. As the power jet is deflected toward receiver 11, a portion of the fluid impinging upon wall 15 immediately adjacent the entrance to receiver 11 passes into such receiver and provides a relatively low pressure output fluid flow through conduit 12. A further increase in the control fluid pressure deflects the power jet further in the direction of receiver 11 and more pressure (or flow) is thereby received at such receiver. At a particular control fluid pressure $P_{c1}$, the power jet is deflected substantially completely into receiver 11 and at this point the maximum pressure is recovered (or flow received) in receiver 11. Without the use of a deflection limiter, as described hereinafter, the normal range of operation of the device, designated as "NORMAL RANGE" in FIGURE 4, is in the range wherein the control fluid pressure varies from zero to a value slightly less than $P_{c1}$. Such normal range produces a characteristic which is equivalent to the operating characteristics of an electronic zener diode component, that is, the curve has a positive slope. Increasing the control pressure beyond $P_{c1}$ would deflect the power jet to the other side of receiver 11 (in the absence of a deflection limiter) and thereby produce a gradually decreasing output pressure as indicated by the negative slope portion 17 of the characteristic curve.

A deflecting member 18 is positioned in vent passage 14 which abuts the entrance to receiver 11 and is so disposed as to begin intersecting the deflected power jet when it is substantially impinging upon the receiver. Deflecting member 18 is preferably positioned remote from power nozzle 6 and relatively close to wall 19. The form of deflecting member 18 is similar to that of the cross section of a modified air foil having a sharp trailing edge 26. The surface adjacent the nondeflected path of the power jet provides a relatively smooth deflecting path for the power jet in a particular deflected condition. The operation of the fluid amplifier with deflection member 18 in place may now be explained. Varying the control fluid pressure in the range designated as NORMAL RANGE in FIGURE 4 permits operation of the amplifier along the positive slope line 16 as in the case without the deflecting member. With deflecting member 18 positioned as illustrated in FIGURE 1, a further increase in control fluid pressure above the pressure represented at the limit of the normal range produces the flat or constant characteristic designated by dashed line 20 in FIGURE 4. This constant output pressure characteristic is obtained by the power jet being deflected from the upper side of deflecting member 18 and thence into receiver 11. It can be appreciated that the operating characteristics of the fluid amplifier illustrated in FIGURE 1, and represented in FIGURE 4 as dashed line 16, provides the equivalent function of an electronic zener diode in that there is a first region wherein the output pressure remains at relatively zero for increasing values of control fluid pressure and a second region wherein the output pressure increases at a relatively steep rate with a further increase in control fluid pressure. A third region wherein the output pressure remains at a substantially fixed value for still further increases in control fluid pressure is necessitated by the inherent characteristics of the analog-type fluid amplifier. In the amplifier hereinabove described, there is no output for a negative control fluid pressure input.

The slope of the characteristic curve in the abovementioned second region may be increased by shaping the wall of vent passages 13 and 14 in the manner illustrated in FIGURE 2. Such streamlined configuration permits the power jet to be more completely exhausted through vent passages 13 and 14 up to the point where the power jet impinges upon receiver 11. Thus, the solid curves in FIGURE 4 which represent the characteristics of the fluid amplifier illustrated in FIGURE 2 are seen to have considerably steeper slope than the curves for FIGURE 1, and to a lesser degree a higher peak pressure may be recovered from the FIGURE 2 amplifier. Deflection limiter 18 in FIGURE 2 operates in the same manner as described for FIGURE 1.

Figure 3:
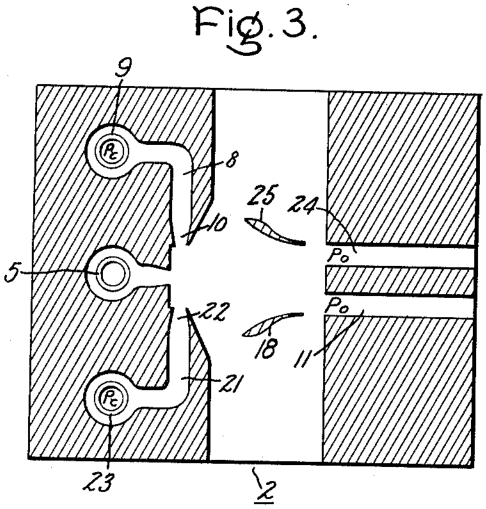
FIGURE 3 is a diagrammatic view in top plan of a third embodiment of my invention which provides a function similar to the operating characteristics of an electronic circuit comprising a back-to-back zener diode arrangement.

The embodiment of the fluid amplifier illustrated in FIGURE 3 provides the equivalent function of a back-to-back zener diode circuit, that is, an electrical circuit having two zener diodes interconnected to be operable with both polarities of an alternating current voltage. The fluid amplifier equivalent of the back-to-back zener diode circuit includes a second control fluid passage 21 terminating in control nozzle 22 and being supplied from a second source of pressurized control fluid by means of conduit 23. Nozzle 22 is disposed on the opposite side of the center line of power nozzle 6 from control nozzle 10 and is also in intersecting relationship to power jet issuing from power nozzle 6. Thus, control nozzles 10 and 22 each can provide control jets which by momentum exchange controllably deflect the power jet from its normal path of travel extending along the center line of nozzle 6. The control fluids supplied to conduits 9 and 23 may comprise separate sources of pressurized fluid or fluid flows representing a differential pressure such as, for example, obtained from the two receivers of a conventional analog-type fluid amplifier. A second fluid receiver 24 is disposed on the opposite side of the center line of nozzle 6 from receiver 11. The two receivers may be equally offset from the center line of power nozzle 6 or they may be unequally offset as desired. A second deflection member 25 is illustrated as being positioned adjacent receiver 24. One or both of receiver 24 and deflecting member 25 may be offset from the center line of power nozzle 6 to a greater or smaller degree than the offset of the corresponding receiver 11 and deflecting member 18 on the opposite side of the center line to provide different limiting characteristics for two directions (polarities) of power jet deflection. A symmetrical arrangement of the two receivers and the two deflection members about the center line of nozzle 6 will provide substantially identical characteristics for the two directions of power jet deflection.

The offset of the receiver and the deflection member from the center line of the power nozzle in the previously illustrated embodiment may be varied as desired. It can be seen that the output pressure $P_o$ starts to rise at a point dependent on the offset of the receiver from the center line and that the limiting level of the output pressure is determined by the position of deflecting member relative to the receiver entrance. Thus, in the most general case, the offset of the receiver and the deflection member are both adjustable to provide the greatest versatility in the operating characteristics of the fluid amplifier. The offset or lateral displacement of receiver 11 from the center line of nozzle 6 may be varied, for example, by forming receiver 11 in a separate plate having a side 15, 19 and thence inserting such plate between the cover plates which also enclose plate 3. The position of receiver 11 may then be adjusted by disconnecting one of the cover plates from the amplifier and shifting the receiver plate in a lateral and/or longitudinal direction, with respect to the center line of the power nozzle. In a similar manner, a deflecting member 18 may be moved in a lateral or longitudinal direction with respect to the power nozzle center line as indicated by the arrows in FIGURE 1. A second method for adjusting the position of the receivers and deflecting members employs the use of guide slots and adjusting screws passing through one of the two cover plates of the device.

From the foregoing description, it can be appreciated that my invention makes available a new fluid-operated device which employs no moving parts and provides the equivalent function of an electronic zener diode. Such device finds application in compensation networks of control systems and in the field of analog computation for the generation of mathematical functions which represent physical nonlinearities such as blacklash and deadband. My device has a further advantage in that the full operating pressure range of the control fluid supply can be utilized. Conventional analog-type amplifiers provide an equivalent diode function only within a particular relatively low control fluid pressure range since at the higher pressures the power jet deflects past the receiver and the recovery pressure or flow undergoes a change having a negative slope which is highly undesirable for diode representation.

Having described a new analog-type fluid amplifier, it is believed obvious that other modifications and variations of my invention are possible in the light of the above teachings. For example, the receiver need not be offset from the center line of the power nozzle, but may be aligned therewith and an additional bias fluid passage employed terminating in a bias control nozzle oppositely disposed to control nozzle 10. Such additional bias fluid passage is supplied, in general, with a constant pressurized fluid flow and the power jet is thereby deflected to a particular offset position relative to the center line of the power nozzle in the absence of control fluid flow in passage 8. It can be appreciated that such arrangement obtains operating characteristics that are very similar to those illustrated in FIGURE 4. It is, therefore, to be understood that changes may be made in the particular embodiments of my invention described which are within the full intended scope of the invention as defined by the following claims.

What I claim as new and desire to secure by Letters Patent of the United States is:

1. An analog-type fluid amplifier adapted to provide a function similar to the operating characteristics of a zener diode comprising first fluid passage means in communication with a constant pressure fluid supply and terminating in a first fluid flow restrictor for providing a pressurized fluid flow comprising a power jet, at least one fluid receiving means downstream from said first restrictor and displaced laterally from the center line thereof, at least one second fluid passage means in communication with a variable pressure fluid supply and terminating in a second fluid flow restrictor for providing a pressurized fluid flow comprising a control jet in intersecting relationship to the power jet which by momentum exchange controllably deflects the power jet relative to said receiving means whereby said receiving means remains at relatively zero fluid pressure for a first range of control fluid pressure and thence the receiving means pressure increases rapidly with further increase in control fluid pressure, a pair of vent passages at opposite sides of the power jet for relieving fluid pressure in said receiving means, and at least one jet deflecting member positioned within said vent passages, said member displaced laterally from the center line of said first fluid flow restrictor for limiting the deflection of the power jet and thereby providing operating characteristics whereby the fluid pressure at said receiving means increases to a predetermined value with the further increase in control fluid pressure and remains relatively constant with still further increase in control fluid pressure.

2. An analog-type fluid amplifier comprising first fluid passage means in communication with a constant pressure fluid supply and terminating in a first fluid flow restrictor for providing a pressurized fluid flow comprising a power jet, a fluid receiving means downstream from said first restrictor and displaced laterally from the center line thereof, a second fluid passage means in communication with a variable pressure fluid supply and terminating in a second fluid flow restrictor for providing a pressurized fluid flow comprising a control jet in intersecting relationship to the power jet which by momentum exchange controllably deflects the power jet relative to said receiving means, a pair of vent passages at opposite sides of the power jet for relieving fluid pressure in said receiving means, a first of said pair of vent passages positioned adjacent said receiving means, and a jet deflecting member positioned within the vent passage adjacent said receiving means, said member displaced laterally from the center line of said first fluid flow restrictor for limiting the deflection of the power jet and thereby maintaining a relatively constant pressure at said receiving means upon further increase in magnitude of the control fluid pressure after the power jet has been deflected to said deflecting member.

3. An analog-type fluid amplifier comprising first fluid passage means in communication with a constant pressure fluid supply and terminating in a first fluid flow restrictor for providing a pressurized fluid flow comprising a power jet, a pair of fluid receiving means downstream from said first restrictor and displaced laterally on either side of the center line thereof, a pair of second fluid passage means in communication with a variable pressure fluid supply and terminating in oppositely disposed second fluid flow restrictors for providing pressurized fluid flows comprising control jets in intersecting relationship to the power jet which by momentum exchange controllably deflect the power jet relative to said receiving means, a pair of vent passages at opposite sides of the power jet for relieving fluid pressure in said receiving means, and a pair of jet deflecting members positioned within said pair of vent passages, each said member displaced laterally from the center line of said first fluid flow restrictor for limiting the deflection of the power jet in two directions and thereby providing a function whereby said receiving means remain at relatively zero fluid pressure in a first range of control fluid pressure, the receiving means pressure increases rapidly in a second and higher range of control fluid pressure, and the receiving means pressure remains relatively constant in a third and highest range of control fluid pressure.

References Cited by the Examiner

UNITED STATES PATENTS

| | | | |
|---|---|---|---|
| 1,923,118 | 8/1933 | Ruder et al. | 138—40 |
| 3,102,389 | 9/1963 | Pedersen et al. | |
| 3,122,165 | 2/1964 | Horton | 137—81.5 |
| 3,170,476 | 2/1965 | Reilly | 137—81.5 |
| 3,174,497 | 3/1965 | Sowers | 137—81.5 |
| 3,176,571 | 4/1965 | Reader. | |
| 3,181,545 | 5/1965 | Murphy | 137—81.5 |

OTHER REFERENCES

"Fluid Logic Devices and Circuits," Mitchell et al., Transactions of the Society of Instrument Technology, Februray 26, 1963 (copy in Group 360 and Scientific Library) (I.B.M. Publication File).

M. CARY NELSON, *Primary Examiner.*

S. SCOTT, *Assistant Examiner.*